(12) United States Patent
Spaulding et al.

(10) Patent No.: US 8,515,635 B2
(45) Date of Patent: Aug. 20, 2013

(54) METHOD AND SYSTEM FOR PROVIDING A BRAKE TRANSMISSION SHIFT INTERLOCK OVERRIDE MODE IN A SHIFT-BY-WIRE TRANSMISSION

(75) Inventors: Todd Curtis Spaulding, Ann Arbor, MI (US); Brian J Deurloo, Howell, MI (US); Mark Edward Zyskowski, Dearborn, MI (US); Richard Reynolds Hathaway, Livonia, MI (US); Jeffrey James Turnavitch, Livonia, MI (US); Christopher Lee Danks, Northville, MI (US); David Spuller, Dexter, MI (US); Charles C Poon, Canton, MI (US); Matthew Luke Fyie, Canton, MI (US)

(73) Assignee: Ford Global Technology, LLC, Dearborn, MI (US)

( * ) Notice: Subject to any disclaimer, the term of this patent is extended or adjusted under 35 U.S.C. 154(b) by 67 days.

(21) Appl. No.: 13/316,041

(22) Filed: Dec. 9, 2011

(65) Prior Publication Data

US 2013/0151092 A1    Jun. 13, 2013

(51) Int. Cl.
*G06F 7/00* (2006.01)

(52) U.S. Cl.
USPC ............. 701/55; 701/51; 701/53; 701/58; 701/61; 701/57; 701/59; 701/60; 477/195; 477/92; 477/99; 477/68; 477/79; 477/37; 477/94; 180/370; 475/121; 475/127; 475/128; 475/129; 475/269

(58) Field of Classification Search
USPC ....... 701/51, 58, 61, 53, 59, 57, 60; 477/195, 477/92, 99, 68, 79, 37, 34, 94; 180/370; 475/121, 127, 128, 129, 269, 303
See application file for complete search history.

(56) References Cited

U.S. PATENT DOCUMENTS

| | | | |
|---|---|---|---|
| 3,937,105 A | 2/1976 | Arai et al. | |
| 4,843,901 A | 7/1989 | Peterson et al. | |
| 4,892,014 A | 1/1990 | Morell et al. | |
| 5,522,776 A | 6/1996 | Alvey | |
| 5,696,679 A | 12/1997 | Marshall et al. | |
| 6,345,224 B1 | 2/2002 | Schumacher et al. | |
| 6,378,393 B1 | 4/2002 | Bates | |
| 6,487,484 B1 | 11/2002 | Shober et al. | |
| 6,732,847 B1 | 5/2004 | Wang | |
| 6,779,645 B2 | 8/2004 | Nagasaka et al. | |
| 6,918,314 B2 | 7/2005 | Wang | |
| 7,156,218 B2 | 1/2007 | Yamamoto | |
| 7,204,785 B2 | 4/2007 | Berger et al. | |
| 7,216,025 B2 | 5/2007 | Keyse et al. | |
| 7,374,511 B2 | 5/2008 | Berger et al. | |
| 7,571,662 B2 | 8/2009 | Pickering et al. | |
| 7,913,583 B2 * | 3/2011 | Reppuhn et al. | 74/473.24 |

(Continued)

*Primary Examiner* — Redhwan K Mawari
(74) *Attorney, Agent, or Firm* — Diederiks & Whitelaw, PLC

(57) ABSTRACT

A method and system provides a Brake Transmission Shift Interlock Override mode in a vehicle including a shift-by-wire transmission. With power applied and ignition on, a driver will press and hold an override switch for a calibrated time. While the override switch is pressed, the driver presses a non-Park button for another calibrated time. The result will be that the vehicle is placed in the selected range wherein the transmission will not automatically shift to Park upon detecting a triggering event. The driver is able to shift the vehicle from Park, even if an electrical failure prevents the transmission from shifting out of Park. As such the vehicle can be driven until the failure is serviced.

13 Claims, 3 Drawing Sheets

(56) References Cited

U.S. PATENT DOCUMENTS

| | | |
|---|---|---|
| 2002/0170376 A1 | 11/2002 | Giefer et al. |
| 2008/0000314 A1* | 1/2008 | Reppuhn et al. ........... 74/473.21 |
| 2008/0173121 A1 | 7/2008 | Kimura et al. |
| 2009/0111647 A1 | 4/2009 | Hecht et al. |
| 2009/0111648 A1 | 4/2009 | Hecht et al. |
| 2009/0111649 A1 | 4/2009 | Hecht et al. |
| 2009/0111654 A1 | 4/2009 | Hecht et al. |
| 2009/0287383 A1 | 11/2009 | Fujii et al. |

* cited by examiner

METHOD AND SYSTEM FOR PROVIDING A BRAKE TRANSMISSION SHIFT INTERLOCK OVERRIDE MODE IN A SHIFT-BY-WIRE TRANSMISSION

BACKGROUND OF THE INVENTION

1. Field of Invention

The present invention pertains to the field of automatic transmissions for motor vehicles and, more particularly, to a method and system for providing a Brake Transmission Shift Interlock Override mode in a shift-by-wire transmission.

2. Background of the Invention

A traditional automatic transmission includes a transmission control device employed to control the transmission of a motor vehicle. The transmission control device is used to select several ranges, such as Park, wherein the transmission is locked to prevent the vehicle from moving, Neutral, wherein the transmission allows the vehicle to be moved freely, such as when being towed, Reverse, wherein the transmission allows the vehicle to move backwards, and one or more Drive ranges that enable forward motion of the vehicle. Usually, the transmission control device is in the form of a lever connected with a mechanical connection, such as a cable or a hydraulic line, to the transmission. Typically, the lever is also connected to an indicator. As the transmission control mechanism is moved from one range to another, the mechanical connection physically shifts the transmission to the selected range and the indicator moves to show the driver which range has been selected. Even if the vehicle is turned off, the driver is able to determine the current transmission range from the indicator and, in some cases, is able to move the transmission control mechanism to Neutral if, for example, the vehicle is to be towed.

The traditional automatic transmission utilizes multiple friction elements for automatic gear ratio shifting. Broadly speaking, these friction elements may be described as torque establishing elements although more commonly they are referred to as clutches or brakes. The friction elements function to establish power flow paths from an internal combustion engine to a set of vehicle traction wheels. During acceleration of the vehicle, the overall speed ratio, which is the ratio of a transmission input shaft speed to a transmission output shaft speed, is reduced during a ratio upshift as vehicle speed increases for a given engine throttle setting. A downshift to achieve a higher speed ratio occurs as an engine throttle setting increases for any given vehicle speed, or when the vehicle speed decreases as the engine throttle setting is decreased. Various planetary gear configurations are found in modern automatic transmissions. However, the basic principle of shift kinematics remains similar. Shifting an automatic transmission having multiple planetary gearsets is accompanied by applying and/or releasing friction elements to change speed and torque relationships by altering the torque path through the planetary gearsets. Friction elements are usually actuated either hydraulically or mechanically based on the position of the transmission control device.

In a shift-by-wire transmission arrangement, the mechanical connection between the transmission control device and the transmission is eliminated. Instead, the transmission control device transmits an electrical signal along a wire to an electronic controller, which directs separate actuators to apply or release the various friction elements to obtain a desired gear ratio. The control device is no longer necessarily in the form of a lever because the control device is no longer moving a mechanical connection for controlling the transmission. Instead, the control device is typically an electro-mechanical interface (e.g., series of buttons, lever, knob) that are used to instruct the transmission to switch between the transmission ranges. An electronic display, powered by a battery on the vehicle, is typically employed to indicate the current range for the transmission and must be on, and thus drawing power, in order for the driver to know which range has been selected.

Many vehicles with a shift-by-wire transmission incorporate a "Return to Park" feature to automatically shift the transmission into Park. See, for example, U.S. Pat. Nos. 3,937,105, 4,892,014 and 7,156,218. Such a feature is activated when certain triggering events occur, for example, when the system detects a seat belt being unbuckled while a driver door is opened when the vehicle is traveling below a calibrated speed, or when the ignition is turned off. Automatically shifting the transmission into Park prevents unwanted motion of the vehicle.

Transmissions often include a brake transmission shift interlock so that once the transmission is shifted into Park the interlock does not allow the transmission to be shifted out of Park unless the ignition is on and the brake pedal is depressed. In a shift-by-wire transmission, in addition to the brake pedal being depressed, the transmission control device must be powered and a vehicle key or fob must be present. While such a feature is helpful in preventing unwanted vehicle movement, once again such a feature is not helpful when the vehicle is to be towed or moved urgently when the vehicle key or fob is not present or when the transmission control device is not functioning properly.

As can be seen by the above discussion, there is a need in the art for a system that allows the vehicle to be shifted from Park to Neutral and maintain Neutral, without the presence of a key or in the event of a brake sensor failure. In a conventional mechanical shifter, Neutral is typically provided by accessing an over-ride lever through a removable panel. Actuating the lever allows the shifter and transmission to be moved from Park into Neutral. With a shift-by-wire transmission, the need for providing a feature that allows the vehicle to shift from Park to Neutral and maintain Neutral without the presence of a key is desired for towing the vehicle for service. This same feature would also allow a shift from Park to any other range in the event of a brake sensor failure, allowing the vehicle to be driven until the brake sensor can be serviced.

SUMMARY OF THE INVENTION

The present invention is directed to a system for providing a Brake Transmission Shift Interlock override mode for a shift-by-wire transmission that is placed in various shift ranges such as Park, Drive, and Neutral and has an automatic Return to Park feature for shifting the transmission to Park when the vehicle is traveling at an extremely low speed or in a stopped condition as a driver prepares to exit the vehicle. The system includes a transmission control mechanism for determining which of the transmission ranges or modes is desired by the driver. A controller is used to receive information from various sensors, such as a door opening sensor, a seat belt sensor, an ignition switch sensor and the transmission control mechanism to determine when to shift the transmission into the various ranges and modes.

In a preferred embodiment, a Brake Transmission Shift Interlock feature includes an override mode that allows the transmission to be shifted out of Park even when a vehicle ignition key or fob is not present or if certain electrical issues are present that otherwise prevent the transmission from exiting Park. The controller is configured to sense activation of an override switch at which time the controller will signal that the system is ready to enter the Brake Transmission Shift Interlock override mode and allow the shifting control mechanism to be shifted from Park without requiring the ignition on or a brake pedal to be pressed. If the ignition is off, the system will then enter the override mode upon sensing shifting of the transmission control mechanism to a desired gear range other than Park, wherein the transmission will stay in Neutral and not automatically shift to Park upon detecting a triggering event. Preferably, entering the override mode only occurs when the override switch is activated for a minimum duration prior to shifting the shifting control mechanism and when the control mechanism is shifted within a maximum amount of time after the minimum duration. A visual confirmation that the system has entered the override mode is displayed for the driver. If the ignition is on, the system will then enter the requested transmission range upon sensing shifting of the transmission control mechanism to a desired range other than Park. The Return to Park features of a shift-by-wire system is maintained when the override mode is activated with the ignition on. Per Federal Motor Vehicle Safety Standard 114, the override switch requires a tool to activate or access. The controller will check the switch to determine if the switch is functioning properly.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF PREFERRED EMBODIMENTS

Figure 1:
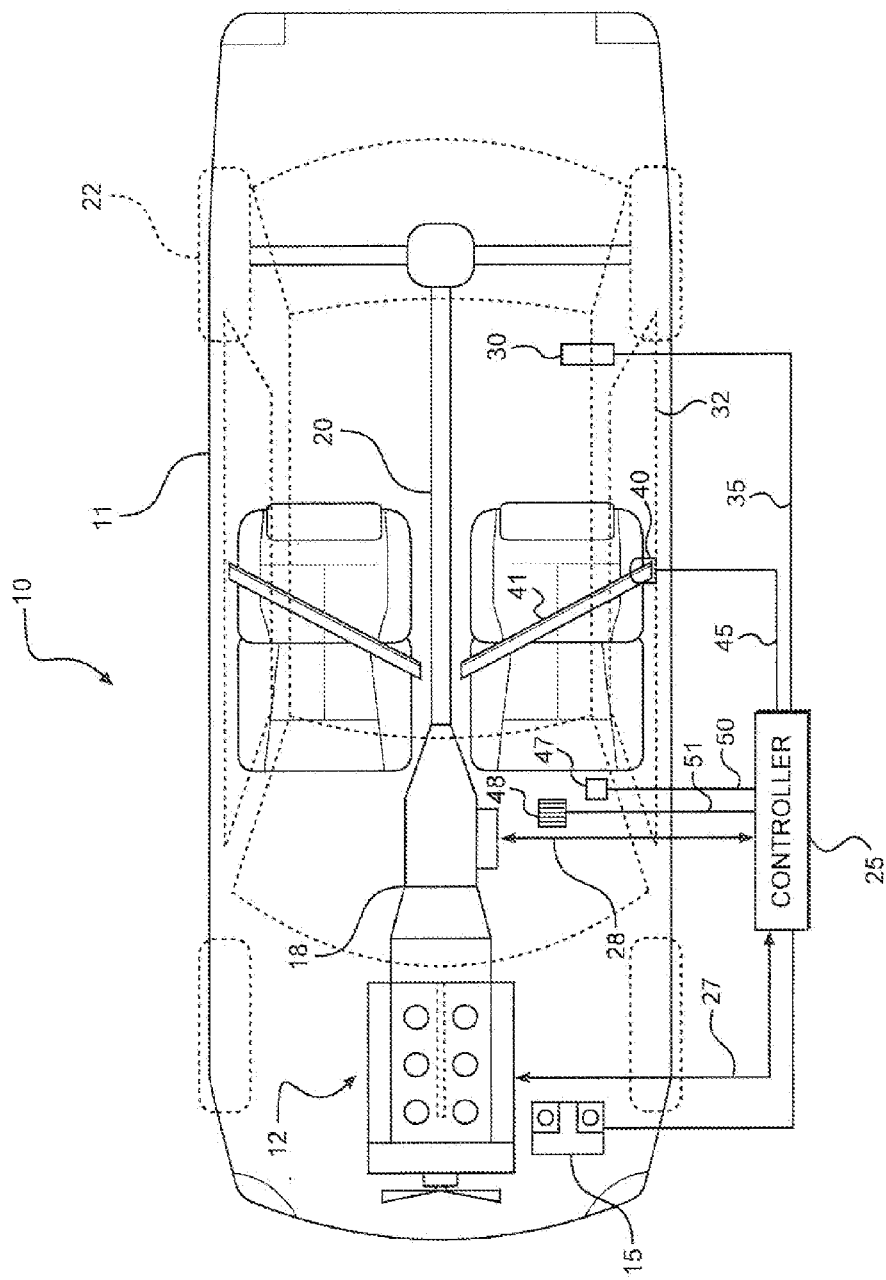
FIG. 1 is a diagram showing a vehicle incorporating a system for providing a Brake Transmission Shift Interlock override mode in a shift-by-wire transmission in accordance with the invention.

With initial reference to FIG. 1, there is shown an automotive vehicle 10 having a body 11 and an engine 12 with a battery 15. Power from engine 12 is transmitted to a transmission 18, then to the other portions of a powertrain 20 and eventually to drive wheels 22. Vehicle 10 is shown as a rear wheel drive vehicle but any type of powertrain arrangement, including front wheel or all wheel drive systems, could be employed. In addition, although engine 12 is shown as an internal combustion engine, other types of drive arrangements, including hybrid drive systems, could be utilized. A controller 25 is connected to engine 12 and transmission 18 by communication lines 27 and 28 respectively. Controller 25 uses inputs from several sources to obtain information used to control engine 12 and transmission 18. For example, controller 25 is connected to a driver door sensor 30, for determining if a driver door 32 is open, by communication line 35. A seat belt sensor 40 determines if a seat belt 41 is fastened and is also connected to controller 25 through a communication line 45. An ignition switch 47 and a brake sensor 48 are connected to controller 25 through lines 50 and 51 respectively.

Figure 2:
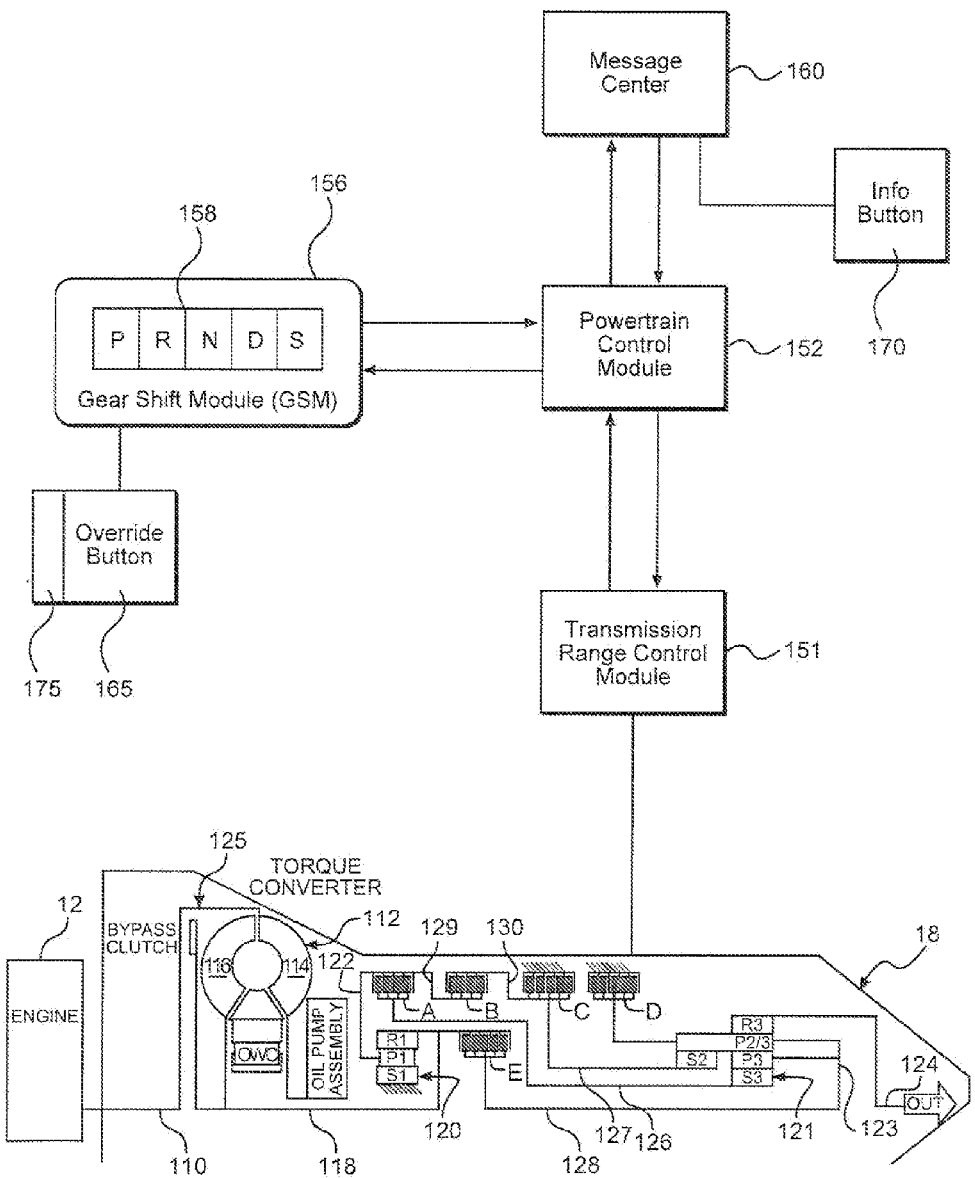
FIG. 2 is a basic schematic diagram of the system in FIG. 1.

FIG. 2 shows more details of transmission 18, which is an example of a multiple-ratio transmission wherein ratio changes are controlled by friction elements acting on individual gear elements. Engine torque from engine 12 is distributed to torque input element 110 of hydrokinetic torque converter 112. An impeller 114 of torque converter 112 develops turbine torque on a turbine 116 in a known fashion. Turbine torque is distributed to a turbine shaft, which is also transmission input shaft 118. Transmission 18 is shown to include a simple planetary gearset 120 and a compound planetary gearset 121. Gearset 120 has a permanently fixed sun gear S1, a ring gear R1 and planetary pinions P1 rotatably supported on a carrier 122. Transmission input shaft 118 is drivably connected to ring gear R1. Compound planetary gearset 121, sometimes referred to as a Ravagineaux gearset, has a small pitch diameter sun gear S3, a torque output ring gear R3, a large pitch diameter sun gear S2 and compound planetary pinions. The compound planetary pinions include long pinions P2/3, which drivably engage short planetary pinions P3 and torque output ring gear R3. Long planetary pinions P2/3 also drivably engage short planetary pinions P3. Short planetary pinions P3 further engage sun gear S3. Planetary pinions P 2/3, P3 of gearset 21 are rotatably supported on compound carrier 123. Ring gear R3 is drivably connected to a torque output shaft 124, which is drivably connected to vehicle traction wheels 22 through powertrain 20 shown in FIG. 1. Gearset 120 is an underdrive ratio gearset arranged in series with respect to compound gearset 121. Typically, transmission 18 preferably includes a lockup or torque converter bypass clutch, as shown at 125, to directly connect transmission input shaft 118 to engine 12 after a torque converter torque multiplication mode is completed and a hydrokinetic coupling mode begins.

FIG. 2 also shows a transmission range control module 151 and a powertrain control module 152 which collectively constitute controller 25. Transmission range control module 151 is connected to transmission 18 by a shift cable (not labeled). Transmission range control module 151 replaces a mechanical shifter that was used to shift transmission from one range to another. A transmission control mechanism such as Gear Shift Module 156 is provided to select a transmission range. One possible implementation would be various buttons 158, each representing a different transmission range. In this type of implementation, Gear Shift Module 156 and buttons 158 collectively constitute a transmission control mechanism. The Gear Shift Module 156 is used to select several ranges, such as Park where the transmission output is locked to prevent vehicle 10 from moving, Neutral where the transmission allows vehicle 10 to be moved freely, such as when being towed, Reverse where transmission 18 allows vehicle 10 to move backwards, and one or more Drive ranges that enable forward motion of vehicle 10. Gear Shift Module 156 is also shown to include a Sport range. The Sport range is similar to Drive but will cause transmission 18 to shift forward ratios based on inputs from upshift and downshift switches (not shown), actuated by the driver. Gear Shift Module buttons 158 are labeled with letters generally corresponding to the several transmission ranges and as such "P", "R", "N", "D", and "S" are shown in FIG. 2. Once transmission 18 has entered one of the ranges, a message center 160 shows the driver which setting was entered. Additionally, Gear Shift Module 156 accepts signals from an override switch 165 that will enable a Brake Transmission Shift Interlock Override mode when requested. Preferably, override button 165 has a cover 175 that protects override button 165 from accidentally being pushed.

The Park range can preferably be entered in many ways. In particular, the driver can select Park by pushing the "P" button and powertrain control module 152 then checks to see if vehicle 10 is traveling below an extremely low speed or stationary and, if so, instructs transmission control module 151 to shift transmission 18 into Park. Alternatively, when the driver ignition switch is turned to off, engine 12 powertrain control module 152 automatically instructs transmission control module 151 to shift transmission 18 into Park, thus enabling a "Return to Park" feature. Similarly, when the driver opens door 32 after unbuckling belt 41, sensors 30 and 40 will signal powertrain control module 152 which automatically instructs transmission control module 51 to shift transmission 18 into Park, thus once again enabling a "Return to Park" feature. The Reverse range is entered by pushing the button labeled "R", at which point powertrain control module 152 automatically instructs transmission control module 151 to shift transmission 18 into Reverse, thus enabling vehicle 10 to move backward. In the exemplary transmission embodiment shown, the Reverse range is established by applying low-and-reverse brake D and friction element B. The Neutral range is entered by a single push of the "N" button on Gear Shift Module 156 or by a push of the "P" button when vehicle 10 is traveling too fast to enter the Park mode. In either case, powertrain control module 152 instructs transmission control module 151 to shift transmission 18 into Neutral and transmission 18 allows wheels 22 to rotate freely.

The Drive or Sport ranges are entered by a single push of the "D" or "S" buttons respectively. Optionally, a Low or "L" range (not shown) can be made available to keep transmission 18 in low ranges during forward motion of vehicle 10. When in Drive in the exemplary transmission shown, during operation in the first four forward driving ratios, carrier P1 is drivably connected to sun gear S3 through shaft 126 and forward friction element A. During operation in the third ratio, and fifth ratio, direct friction element B drivably connects carrier 22 to shaft 127, which is connected to large pitch diameter sun gear S2. During operation in the fourth, fifth and sixth forward driving ratios, overdrive friction element E connects turbine shaft 118 to compound carrier 123 through shaft 128. Friction element C acts as a reaction brake for sun gear S2 during operation in second and sixth forward driving ratios. During operation of the third forward driving ratio, direct friction element B is applied together with forward friction element A. The elements of gearset 121 then are locked together to effect a direct driving connection between shaft 128 and output shaft 126. The torque output side of forward friction element A is connected through torque transfer element 129 to the torque input side of direct friction element B during forward drive. The torque output side of direct friction element B, during forward drive, is connected to shaft 127 through torque transfer element 130. More details of this type of transmission arrangement are found in U.S. Pat. No. 7,216,025, which is hereby incorporated by reference.

Figure 3:
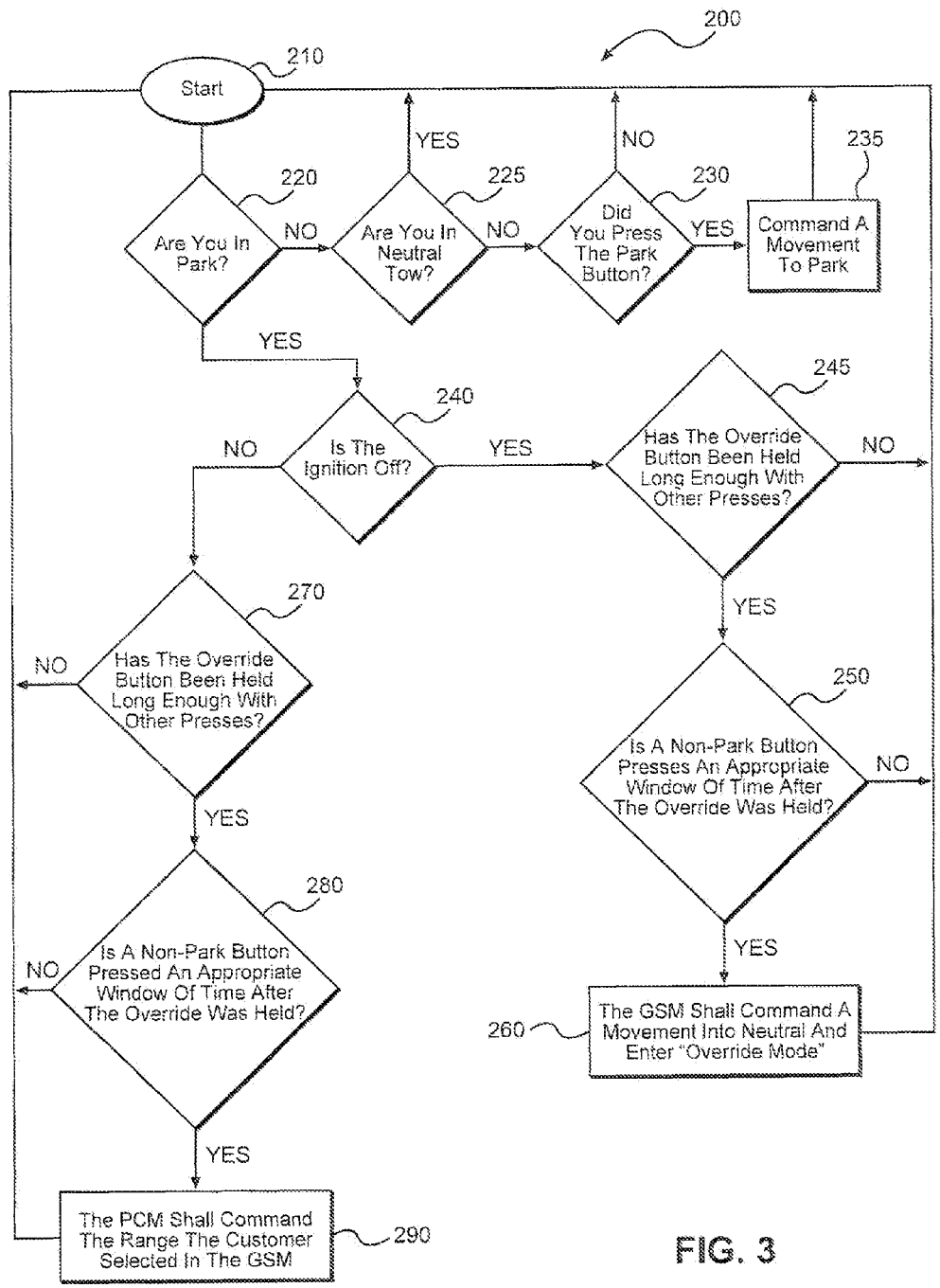
FIG. 3 is a flowchart showing a control routine employed in the system of FIG. 1 used to enter the override mode according to a preferred embodiment of the invention.

As will be detailed more fully below, to force the override mode with power applied, the driver will need to press and hold override switch 165 for a calibrated time, e.g., 3 seconds. While override switch 165 is pressed, the driver presses Neutral button "N" for a calibrated time, e.g., 3 seconds. The result will be that transmission 18 is shifted from Park to Neutral, and will maintain in Neutral while disabling all return to Park features. Preferably, switch 165 is hidden under removable cover 175, which is only removable with a tool. More specifically, FIG. 3 shows a preferred method of overriding normal transmission operation in order to force the override mode. Starting at step 210, controller 25 determines whether or not transmission 18 is in Park at 220. If not, controller 25 returns to start 210 unless transmission 18 is in Neutral Tow mode at 225. The Neutral Tow mode is a mode that disables all Return to Park features and allows vehicle 10 to be towed long distances. An exemplary description of the Neutral Tow mode is found in concurrently filed U.S. patent application entitled "Method and System for Providing a Neutral Tow Mode in a Shift-by-Wire Transmission" incorporated herein by reference. If the system is not in Neutral Tow mode, and if Park button "P" is pressed at 230, transmission 18 engages Park in step 235. Controller 25 then returns to start 210. If transmission 18 is in Park at step 220 then ignition switch 47 is checked at step 240 to determine which of two similar logical paths is selected.

If ignition switch 47 is "off" at step 240 then controller 25 determines if override switch 165 has been held long enough at 245. If yes, controller 25 checks if a Non-Park button has been pressed at 250 within an appropriate window of time after override switch 165 was pressed and, if so, controller 25 moves transmission 18 into Neutral and enters the override mode. In this situation, the shifting control mechanism is allowed to be shifted from Park without requiring brake pedal 48 to be pressed but preferably entering the override mode only occurs when override switch 165 is activated for a minimum duration prior to shifting the shifting control mechanism. Furthermore, entering the override mode only occurs when the control mechanism is shifted within a maximum amount of time after the minimum duration. In the override mode, transmission 18 will stay in Neutral and not automatically shift to Park upon detecting a triggering event (e.g., door open, seatbelt off or ignition off).

If ignition switch is "on" at step 240 then controller 25 determines if override switch 165 has been held long enough at 270 and if a Non-Park button has been pressed at 280 within an appropriate window of time after override switch 165 was pressed and, if so, in step 290 controller 25 moves transmission 18 into the range selected in step 280 so as to enter the desired gear range with Return to Park function still active. Also, the method may include checking switch 165 to determine if switch 165 is functioning properly. With this preferred method, the driver is able to shift the vehicle to Neutral, without the presence of a key FOB or if certain vehicle electrical issues prevent transmission 18 from shifting out of Park. As such vehicle 10 can be moved or towed when the Brake Transmission Shift Interlock is not functioning properly.

Although described with reference to preferred embodiments of the invention, it should be readily understood that various changes and/or modifications could be made to the invention without departing from the spirit thereof. For instance, numerous minor variations to the preferred methods of entering and exiting the override mode could be made without changing the inventive concept. In addition, although push buttons are employed in the disclosed embodiments, various other selecting arrangements including numerous switches could be employed. In general, the invention is only intended to be limited by the scope of the following claims.

The invention claimed is:

1. A method of providing an override mode for overriding a shift interlock that does not allow a shift-by-wire transmission to be shifted out of Park unless an ignition switch is on and a brake pedal is depressed, said method comprising:
   sensing activation of an override switch;
   allowing a transmission control mechanism to be shifted from Park without requiring a brake pedal to be pressed or a key to be present when the override switch has been activated; and
   entering the override mode upon sensing a shift through the transmission control mechanism to a desired gear range other than Park only when the override switch is activated for a minimum duration prior to selecting a non- Park range and the non-Park range is selected within a maximum amount of time after the minimum duration.

2. The method of claim 1, further comprising: sensing if the ignition switch is on and, if so, entering the desired gear range and not entering the override mode.

3. The method of claim 1, wherein the desired gear range is Neutral, said method further comprising causing the transmission to stay in Neutral and not automatically shift to Park upon detecting a triggering event.

4. The method of claim 1, further comprising: displaying visual confirmation that the shift-by-wire transmission has entered the override mode.

5. The method of claim 1, further comprising: hiding the override switch by positioning the override switch under a removable cover or slot that prevents actuation of the override switch without a tool.

6. The method of claim 1, further comprising checking the override switch to determine if the override switch is functioning properly.

7. A system for providing a mode for overriding a brake transmission shift interlock comprising:
    a shift by wire transmission;
    a transmission control mechanism for controlling the transmission;
    a brake transmission interlock for preventing the transmission from shifting out of Park unless a key is present and a brake pedal is pressed;
    a detector for detecting when an override switch has been activated; and
    a controller configured to enter the override mode, to allow shifting of the transmission control mechanism to a desired gear range other than Park without requiring the brake pedal to be pressed or the key to be present, only when the override switch has been activated for a minimum duration prior to selecting a non-Park range and the non-Park range is selected within a maximum amount of time after the minimum duration.

8. The system of claim 7, further comprising: an ignition switch, wherein the controller is further configured to detect if the ignition switch is on and, if so, to enter the desired gear range and not enter the override mode.

9. The system of claim 7, wherein the non-Park range is Neutral and the controller is further configured to maintain the transmission in Neutral and not shift the transmission to Park upon detecting a triggering event.

10. The system of claim 7, further comprising: a display configured to signal that the system has entered the override mode.

11. The system of claim 7, further comprising: a cover positioned to hide the override switch, said cover only being removable with a tool.

12. The system of claim 7, wherein the controller is further configured to check the override switch to determine if the override switch is functioning properly.

13. The system of claim 7, wherein the override switch may only be activated by use of a tool.

* * * * *